United States Patent
Sakaguchi

(10) Patent No.: US 12,518,382 B2
(45) Date of Patent: Jan. 6, 2026

(54) MEDICAL SYSTEM, METHOD FOR PROCESSING MEDICAL IMAGE, AND MEDICAL IMAGE PROCESSING APPARATUS

(71) Applicant: TERUMO KABUSHIKI KAISHA, Tokyo (JP)

(72) Inventor: Yuki Sakaguchi, Kanagawa (JP)

(73) Assignee: TERUMO KABUSHIKI KAISHA, Tokyo (JP)

( * ) Notice: Subject to any disclaimer, the term of this patent is extended or adjusted under 35 U.S.C. 154(b) by 292 days.

(21) Appl. No.: 18/471,264

(22) Filed: Sep. 20, 2023

(65) Prior Publication Data

US 2024/0013386 A1 Jan. 11, 2024

Related U.S. Application Data

(63) Continuation of application No. PCT/JP2022/010199, filed on Mar. 9, 2022.

(30) Foreign Application Priority Data

Mar. 30, 2021 (JP) .................. 2021-058297

(51) Int. Cl.
*G06F 7/00* (2006.01)
*G06T 7/00* (2017.01)
*G06T 7/62* (2017.01)

(52) U.S. Cl.
CPC .............. *G06T 7/0012* (2013.01); *G06T 7/62* (2017.01); *G06T 2207/10132* (2013.01); *G06T 2207/30021* (2013.01); *G06T 2207/30101* (2013.01)

(58) Field of Classification Search
CPC .............................. G06T 7/0012; G06T 7/62; G06T 2207/10132
See application file for complete search history.

(56) References Cited

U.S. PATENT DOCUMENTS 6,200,268 B1 * 3/2001 Vince .................. A61B 8/4461
600/463
6,491,636 B2 * 12/2002 Chenal ................. A61B 8/0883
600/450

(Continued)

FOREIGN PATENT DOCUMENTS

JP 2000-287165 A 10/2000
JP 2016-525893 A 9/2016

(Continued)

OTHER PUBLICATIONS

English Translation of International Search Report dated May 31, 2022, mailed in counterpart International Application No. PCT/JP2022/010199, 2 pages.

(Continued)

*Primary Examiner* — Mohammed H Zuberi
(74) *Attorney, Agent, or Firm* — Kim & Stewart LLP

(57) ABSTRACT

A medical system includes a catheter that includes a sensor and insertable into a luminal organ and an image processing apparatus configured to: generate first cross-sectional images of the organ based on sensor signals output when the catheter is moved along the organ, select second images from the first images at predetermined intervals, input the second images to a machine learning model and acquire a type and region of an object in each second image, determine one second image as a reference, determine two or more first images generated before and after the reference, input said two or more first images to the model and acquire the type and region of the object in said two or more first images, and output information based on the type and region of the object acquired from each of the reference and said two or more first images.

20 Claims, 12 Drawing Sheets

(56) References Cited

U.S. PATENT DOCUMENTS

| | | | |
|---|---|---|---|
| 7,074,188 B2 * | 7/2006 | Nair | A61B 5/02007 600/463 |
| 7,359,554 B2 * | 4/2008 | Klingensmith | A61B 5/02007 382/199 |
| 7,831,081 B2 * | 11/2010 | Li | G06T 7/12 382/199 |
| 8,057,394 B2 * | 11/2011 | Dala-Krishna | A61B 8/0883 600/437 |
| 8,929,629 B1 * | 1/2015 | Rozenfeld | G06T 7/0012 382/128 |
| 9,770,172 B2 | 9/2017 | Sturm | |
| 11,556,731 B2 | 1/2023 | Nishimura | |
| 2003/0212491 A1 * | 11/2003 | Mitchell | G06T 7/0012 702/1 |
| 2007/0100226 A1 * | 5/2007 | Yankelevitz | G06T 7/0012 600/407 |
| 2008/0021275 A1 * | 1/2008 | Tearney | A61B 5/0066 600/117 |
| 2008/0187201 A1 * | 8/2008 | Liang | G06V 20/64 382/131 |
| 2010/0094127 A1 * | 4/2010 | Xu | G06T 7/90 600/425 |
| 2010/0161023 A1 * | 6/2010 | Cohen | G06T 7/246 623/2.11 |
| 2011/0026797 A1 * | 2/2011 | Declerck | G06T 7/0012 382/131 |
| 2011/0087104 A1 * | 4/2011 | Moore | G01S 7/52071 600/447 |
| 2011/0206250 A1 * | 8/2011 | McGinnis | G06T 7/0012 382/128 |
| 2011/0257545 A1 * | 10/2011 | Suri | A61B 8/5223 600/508 |
| 2012/0075638 A1 * | 3/2012 | Rollins | A61B 1/3137 356/479 |
| 2012/0170848 A1 * | 7/2012 | Kemp | A61B 6/5258 382/275 |
| 2012/0316421 A1 * | 12/2012 | Kumar | A61B 1/000096 600/407 |
| 2013/0152020 A1 * | 6/2013 | Nishiyama | G16H 30/20 715/835 |
| 2016/0292875 A1 * | 10/2016 | Kono | G06T 7/64 |
| 2019/0272631 A1 * | 9/2019 | Shemonski | A61B 3/102 |
| 2020/0359911 A1 * | 11/2020 | Olender | A61B 5/1076 |
| 2021/0059758 A1 * | 3/2021 | Avendi | A61B 8/469 |
| 2021/0335480 A1 * | 10/2021 | Johnsson | G06T 15/08 |
| 2022/0020496 A1 | 1/2022 | Saito et al. | |
| 2023/0017334 A1 * | 1/2023 | Sakaguchi | G06V 10/764 |
| 2023/0025720 A1 * | 1/2023 | Sakamoto | G06T 15/10 |
| 2023/0210381 A1 * | 7/2023 | Bloms | A61B 5/0215 600/408 |
| 2024/0081781 A1 * | 3/2024 | Wang | A61B 8/0891 |
| 2024/0242351 A1 * | 7/2024 | Kusu | G06T 7/11 |

FOREIGN PATENT DOCUMENTS

| | | |
|---|---|---|
| WO | 2019/064704 A1 | 4/2019 |
| WO | 2020/105699 A1 | 5/2020 |

OTHER PUBLICATIONS

English Translation of Written Opinion dated May 31, 2022, mailed in counterpart International Application No. PCT/JP2022/010199, 5 pages.

* cited by examiner

TOMOGRAPHIC IMAGE
(IVUS IMAGE, OCT IMAGE)

MEDICAL SYSTEM, METHOD FOR PROCESSING MEDICAL IMAGE, AND MEDICAL IMAGE PROCESSING APPARATUS

CROSS-REFERENCE TO RELATED APPLICATION

This application is a continuation of International Patent Application No. PCT/JP2022/010199 filed Mar. 9, 2022, which is based upon and claims the benefit of priority from Japanese Patent Application No. 2021-058297, filed on Mar. 30, 2021, the entire contents of which are incorporated herein by reference.

FIELD

Embodiments described herein relate generally to a medical system, a method for processing a medical image of a luminal organ, and a medical image processing apparatus.

BACKGROUND

An ultrasonic tomographic image of a blood vessel is generated by an intravascular ultrasound (IVUS) method using a catheter during an ultrasound examination of the blood vessel. Meanwhile, for the purpose of assisting diagnosis by a physician, a technology of adding information to a blood vessel image by image processing or machine learning has been developed. Such a technology includes a feature detection method for detecting a lumen wall, a stent, and the like included in the blood vessel image.

However, in such a detection method, the features of the lumen wall are uniformly detected for all the generated blood vessel images.

SUMMARY OF THE INVENTION

Embodiments of the present disclosure provide a medical system or the like that efficiently detects an object based on a medical image obtained by scanning a luminal organ with a catheter.

In one embodiment, a medical system comprises a catheter that includes a sensor and can be inserted into a luminal organ; a display apparatus; and an image processing apparatus configured to: generate a plurality of first cross-sectional images of the luminal organ based on signals that are output from the sensor when the catheter is being moved in a direction along the luminal organ therein, select a plurality of second cross-sectional images from the first cross-sectional images at predetermined intervals, input the second cross-sectional images to a machine learning model and acquire an output indicating a type and region of an object included in each of the second cross-sectional images, determine one of the second cross-sectional images as a reference image based on the type and region of the object, determine two or more of the first cross-sectional images generated before and after the reference image, input said two or more of the first cross-sectional images to the machine learning model and acquire an output indicating the type and region of the object included in each of said two or more of the first cross-sectional images, and cause the display apparatus to output information indicating the object based on the type and region of the object acquired from each of the reference image and said two or more of the first cross-sectional images.

According to the present disclosure, it is possible to provide a medical system or the like that efficiently detects an object based on a medical image obtained by scanning a luminal organ with a catheter.

DETAILED DESCRIPTION

Hereinafter, embodiments of the present disclosure will be described in detail with reference to the drawings. In each of the following embodiments, a cardiac catheter treatment as an endovascular treatment will be described as an example, but a luminal organ to be subjected to a catheter treatment is not limited to a blood vessel, and may be other luminal organs such as a bile duct, a pancreatic duct, a bronchus, and an intestine.

First Embodiment

Figure 1:
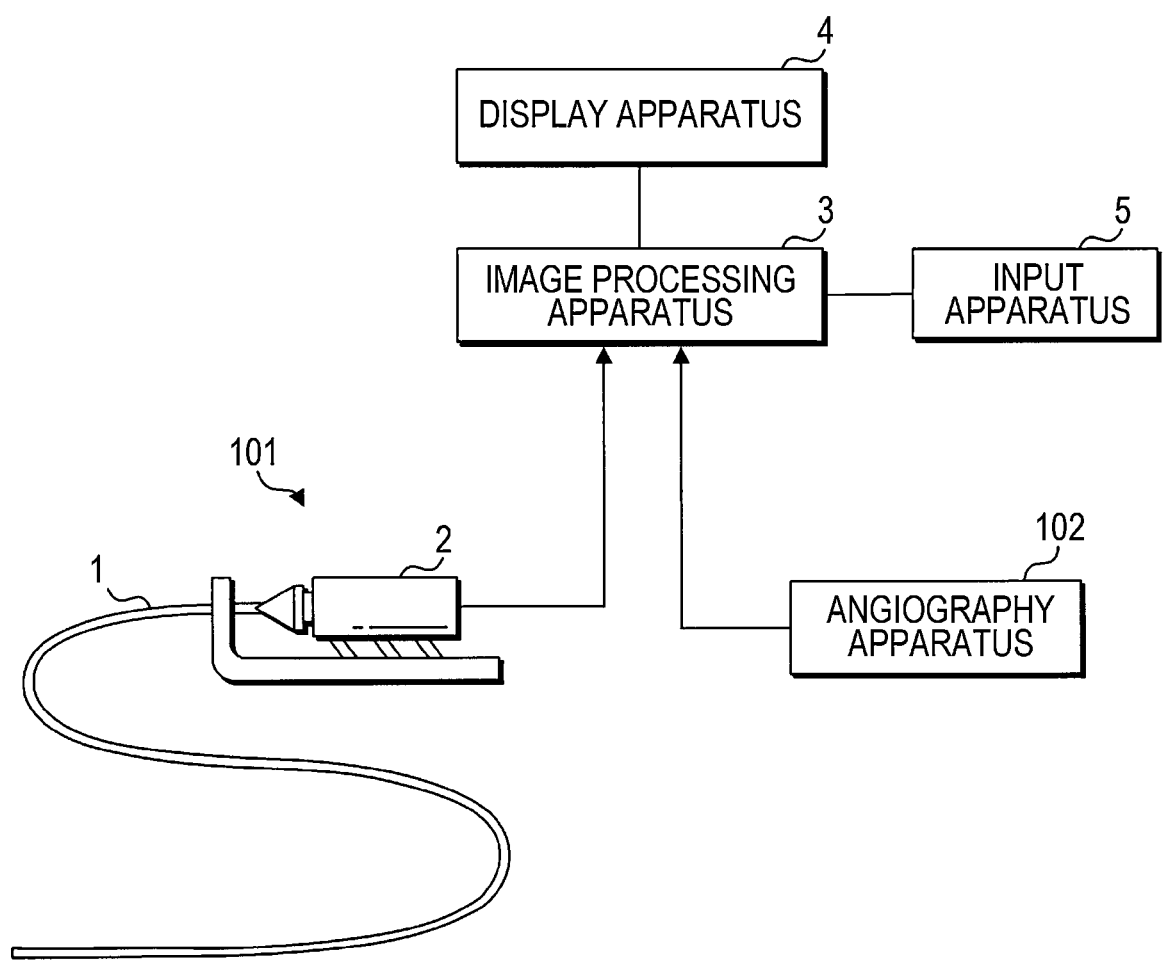
FIG. 1 is a diagram illustrating a configuration example of an image diagnosis apparatus.

FIG. 1 is a diagram illustrating a configuration example of an image diagnosis system 100. In the present embodiment, the image diagnosis system 100 using a dual type catheter having functions of both intravascular ultrasound (IVUS) and optical coherence tomography (OCT) will be described. In the dual type catheter, a mode of acquiring an ultrasonic tomographic image only by IVUS, a mode of acquiring an optical coherence tomographic image only by OCT, and a mode of acquiring tomographic images by both IVUS and OCT are provided, and these modes can be switched and used. Hereinafter, an ultrasonic tomographic image and an optical coherence tomographic image are referred to as an IVUS image and an OCT image, respectively. In addition, an IVUS image and an OCT image are collectively referred to as tomographic images, and correspond to medical images.

The image diagnosis system 100 of the present embodiment includes an intravascular inspection apparatus 101, an angiography apparatus 102, an image processing apparatus 3, a display apparatus 4, and an input apparatus 5. The intravascular inspection apparatus 101 includes an image diagnosis catheter 1 and a motor drive unit (MDU) 2. The image diagnosis catheter 1 is connected to the image processing apparatus 3 via the MDU 2. The display apparatus 4 and the input apparatus 5 are connected to the image processing apparatus 3. The display apparatus 4 is, for example, a liquid crystal display (LCD), an organic EL (electro-luminescence) display, or the like, and the input apparatus 5 is, for example, a keyboard, a mouse, a trackball, a microphone, or the like. The display apparatus 4 and the input apparatus 5 may be integrated into a touch panel. Further, the input apparatus 5 and the image processing apparatus 3 may be integrated into one apparatus. Furthermore, the input apparatus 5 may be a sensor that receives a gesture input, a line-of-sight input, or the like.

The angiography apparatus 102 is connected to the image processing apparatus 3. The angiography apparatus 102 images a blood vessel from outside a living body of a patient using X-rays while injecting a contrast agent into the blood vessel of the patient to obtain an angiographic image that is a fluoroscopic image of the blood vessel. The angiography apparatus 102 includes an X-ray source and an X-ray sensor, and captures an X-ray fluoroscopic image of the patient by the X-ray sensor receiving X-rays emitted from the X-ray source. Note that the image diagnosis catheter 1 is provided with a radiopaque marker, and the position of the image diagnosis catheter 1 is visualized in the angiographic image using a marker. The angiography apparatus 102 outputs the angiographic image obtained by imaging to the image processing apparatus 3, and causes the display apparatus 4 to display the angiographic image via the image processing apparatus 3. The display apparatus 4 displays the angiographic image and the tomographic image imaged using the image diagnosis catheter 1.

Figure 2:
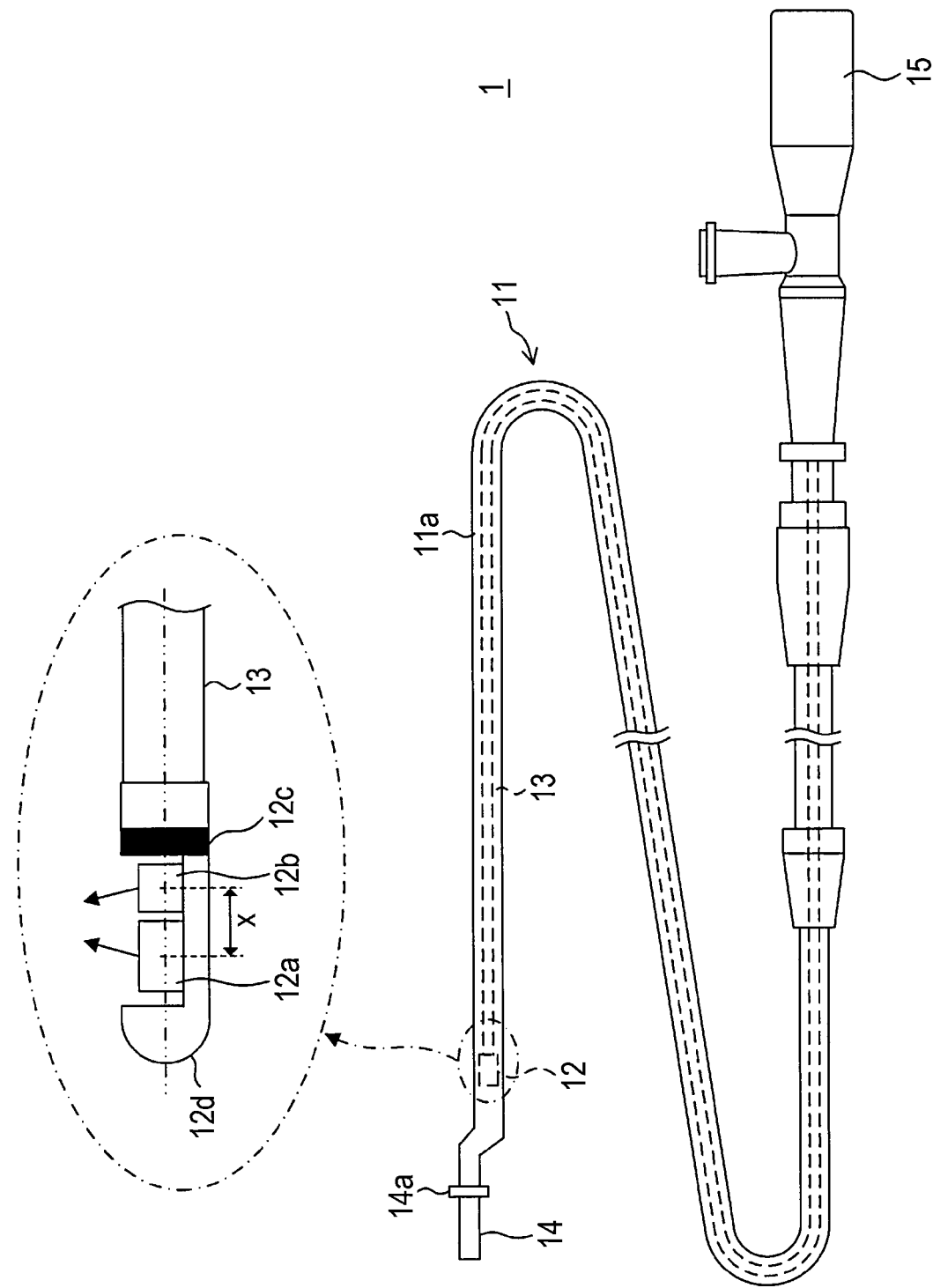
FIG. 2 is a schematic diagram of an image diagnosis catheter.

FIG. 2 is a schematic diagram of the image diagnosis catheter 1. Note that the region surrounded by a one-dot chain line on the upper side in FIG. 2 is an enlarged view of the region surrounded by a one-dot chain line on the lower side. The image diagnosis catheter 1 includes a probe 11 and a connector portion 15 disposed at an end of the probe 11. The probe 11 is connected to the MDU 2 via the connector portion 15. In the following description, a side far from the connector portion 15 of the image diagnosis catheter 1 will be referred to as a distal end side, and a side of the connector portion 15 will be referred to as a proximal end side. The probe 11 includes a catheter sheath 11a, and a guide wire insertion portion 14 through which a guide wire can be inserted is provided at a distal portion thereof. The guide wire insertion portion 14 constitutes a guide wire lumen, receives a guide wire previously inserted into a blood vessel, and guides the probe 11 to an affected part by the guide wire. The catheter sheath 11a forms a tube portion continuous from a connection portion with the guide wire insertion portion 14 to a connection portion with the connector portion 15. A shaft 13 is inserted into the catheter sheath 11a, and a sensor unit 12 is connected to a distal end side of the shaft 13.

The sensor unit 12 includes a housing 12d, and a distal end side of the housing 12d is formed in a hemispherical shape in order to suppress friction and catching with an inner surface of the catheter sheath 11a. In the housing 12d, an ultrasound transmitter and receiver 12a (hereinafter referred to as an IVUS sensor 12a) that transmits ultrasonic waves into a blood vessel and receives reflected waves from the blood vessel and an optical transmitter and receiver 12b (hereinafter referred to as an OCT sensor 12b) that transmits near-infrared light into the blood vessel and receives reflected light from the inside of the blood vessel are disposed. In the example illustrated in FIG. 2, the IVUS sensor 12a is provided on the distal end side of the probe 11, the OCT sensor 12b is provided on the proximal end side thereof, and the IVUS sensor 12a and the OCT sensor 12b are arranged apart from each other by a distance X along the axial direction on the central axis of the shaft 13 between two chain lines in FIG. 2. In the image diagnosis catheter 1, the IVUS sensor 12a and the OCT sensor 12b are attached such that a radial direction of the shaft 13 that is approximately 90 degrees with respect to the axial direction of the shaft 13 is set as a transmission/reception direction of an ultrasonic wave or near-infrared light. Note that the IVUS sensor 12a and the OCT sensor 12b are desirably attached slightly shifted from the radial direction so as not to receive a reflected wave or reflected light on the inner surface of the catheter sheath 11a. In the present embodiment, for example, as indicated by the arrows on the upper side of FIG. 2, the IVUS sensor 12a is attached with a direction inclined to the proximal end side with respect to a radial direction as an irradiation direction of the ultrasonic wave, and the OCT sensor 12b is attached with a direction inclined to the distal end side with respect to the radial direction as an irradiation direction of the near-infrared light.

An electric signal cable (not illustrated) connected to the IVUS sensor 12a and an optical fiber cable (not illustrated) connected to the OCT sensor 12b are inserted into the shaft 13. The probe 11 is inserted into the blood vessel from the distal end side. The sensor unit 12 and the shaft 13 can move forward or rearward inside the catheter sheath 11a and can rotate in a circumferential direction. The sensor unit 12 and the shaft 13 rotate about the central axis of the shaft 13 as a rotation axis. In the image diagnosis system 100, by using an imaging core including the sensor unit 12 and the shaft 13, a state of the blood vessel is observed by an ultrasonic tomographic image captured from the inside of the blood vessel or an optical coherence tomographic image captured from the inside of the blood vessel.

The MDU 2 is a drive device to which the probe 11 of the image diagnosis catheter 1 is detachably attached by the connector portion 15, and controls the operation of the image diagnosis catheter 1 inserted into the blood vessel by driving a built-in motor according to an operation by a medical worker. For example, the MDU 2 performs a pull-back operation of rotating the sensor unit 12 and the shaft 13 inserted into the probe 11 in the circumferential direction while pulling the sensor unit 12 and the shaft 13 toward the MDU 2 side at a constant speed. The sensor unit 12 continuously scans the inside of the blood vessel at predetermined time intervals while moving from the distal end side to the proximal end side by the pull-back operation and continuously captures a plurality of transverse tomographic images substantially perpendicular to the probe 11 at predetermined intervals. The MDU 2 outputs reflected wave data of an ultrasonic wave received by the IVUS sensor 12a and reflected light data received by the OCT sensor 12b to the image processing apparatus 3.

Figure 3:
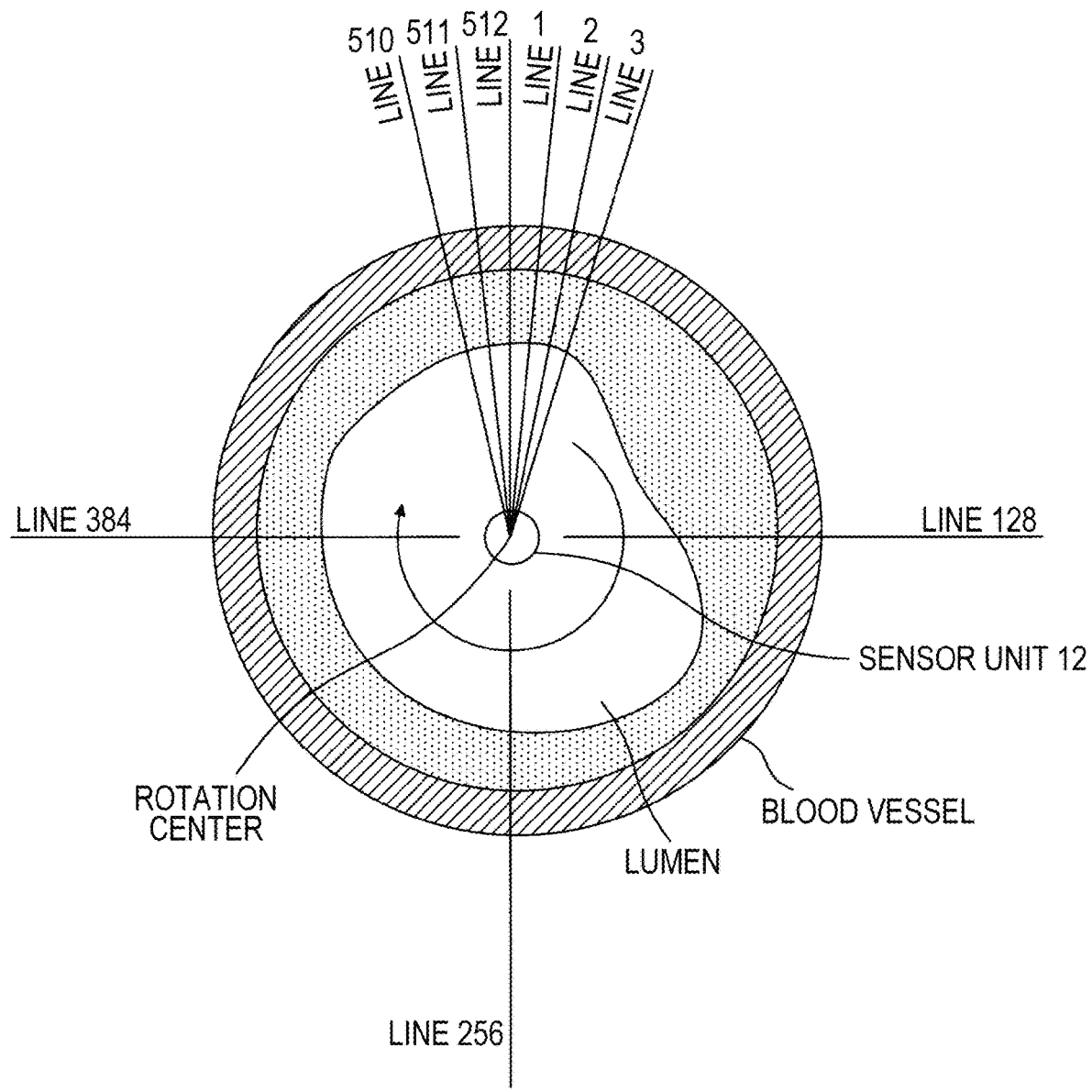
FIG. 3 is an explanatory diagram illustrating a cross section of a blood vessel through which a sensor unit is inserted.
Figure 4A:
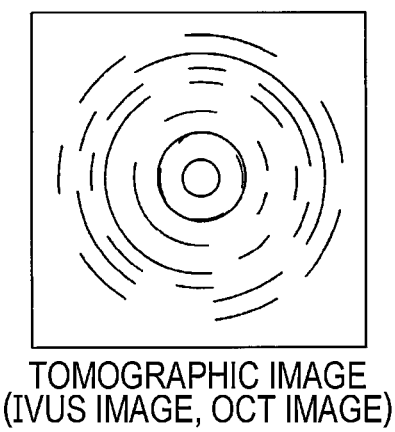
FIGS. 4A and 4B are explanatory diagrams of tomographic images.
Figure 4B:
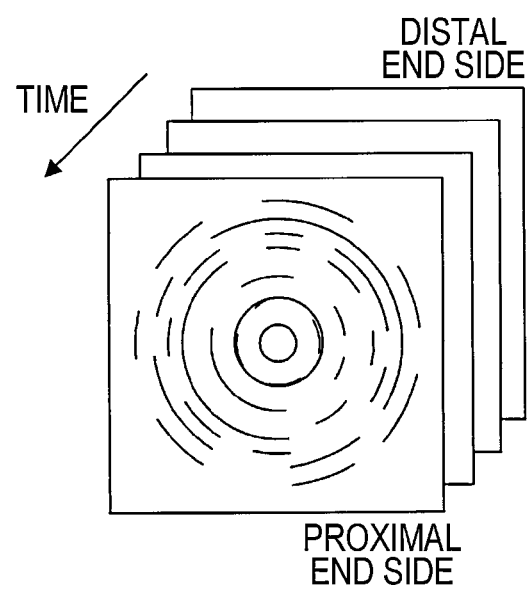

The image processing apparatus 3 acquires a signal data set which is the reflected wave data of the ultrasonic wave received by the IVUS sensor 12a and a signal data set which is reflected light data received by the OCT sensor 12b via the MDU 2. The image processing apparatus 3 generates ultrasound line data from the ultrasound signal data set, and generates an ultrasonic tomographic image of a transverse section of the blood vessel based on the generated ultrasound line data. In addition, the image processing apparatus 3 generates optical line data from the signal data set of the reflected light, and generates an optical tomographic image of a transverse section of the blood vessel based on the generated optical line data. Here, the signal data set acquired by the IVUS sensor 12a and the OCT sensor 12b and the tomographic image generated from the signal data set will be described. FIG. 3 is an explanatory diagram illustrating a cross section of the blood vessel through which the sensor unit 12 is inserted, and FIGS. 4A and 4B are explanatory diagrams of the tomographic images.

First, with reference to FIG. 3, operations of the IVUS sensor 12a and the OCT sensor 12b in the blood vessel, and signal data sets (i.e., ultrasonic line data and optical line data) acquired by the IVUS sensor 12a and the OCT sensor 12b will be described. When the imaging of the tomographic image is started in a state where the imaging core is inserted into the blood vessel, the imaging core rotates about the central axis of the shaft 13 as indicated by the arrow in FIG. 3. At this time, the IVUS sensor 12a transmits and receives an ultrasonic wave at each rotation angle. Lines 1, 2, ... 512 indicate transmission/reception directions of ultrasonic waves at each rotation angle. In the present embodiment, the IVUS sensor 12a intermittently transmits and receives ultrasonic waves 512 times while rotating 360 degrees (i.e., one rotation) in the blood vessel. Since the IVUS sensor 12a acquires data of one line in the transmission/reception direction by transmitting and receiving an ultrasonic wave once, it is possible to obtain 512 pieces of ultrasonic line data radially extending from the rotation center during one rotation. The 512 pieces of ultrasonic line data are dense in the vicinity of the rotation center, but become sparse with distance from the rotation center. Therefore, the image processing apparatus 3 can generate a two-dimensional ultrasonic tomographic image as illustrated in FIG. 4A by generating pixels in an empty space of each line by known interpolation processing.

Similarly, the OCT sensor 12b also transmits and receives the measurement light at each rotation angle. Since the OCT sensor 12b also transmits and receives the measurement light 512 times while rotating 360 degrees in the blood vessel, it is possible to obtain 512 pieces of optical line data radially extending from the rotation center during one rotation. Moreover, for the optical line data, the image processing apparatus 3 can generate a two-dimensional optical coherence tomographic image similar to the IVUS image illustrated in FIG. 4A by generating pixels in a vacant space of each line by known interpolation processing. That is, the image processing apparatus 3 generates optical line data based on interference light generated by causing reflected light and, for example, reference light obtained by separating light from a light source in the image processing apparatus 3 to interfere with each other, and generates an optical tomographic image) of the transverse section of the blood vessel based on the generated optical line data.

The two-dimensional tomographic image generated from the 512 pieces of line data in this manner is referred to as an IVUS image or an OCT image of one frame. Since the sensor unit 12 scans while moving in the blood vessel, an IVUS image or an OCT image of one frame is acquired at each position rotated once within a movement range. That is, since the IVUS image or the OCT image of one frame is acquired at each position from the distal end side to the proximal end side of the probe 11 in the movement range, as illustrated in FIG. 4B, the IVUS image or the OCT image of a plurality of frames is acquired within the movement range.

The image diagnosis catheter 1 has a radiopaque marker in order to confirm a positional relationship between the IVUS image obtained by the IVUS sensor 12a or the OCT image obtained by the OCT sensor 12b and the angiographic image obtained by the angiography apparatus 102. In the example illustrated in FIG. 2, a marker 14a is provided at the distal portion of the catheter sheath 11a, for example, the guide wire insertion portion 14, and a marker 12c is provided on the shaft 13 side of the sensor unit 12. When the image diagnosis catheter 1 configured as described above is imaged with X-rays, an angiographic image in which the markers 14a and 12c are visualized is obtained. The positions at which the markers 14a and 12c are provided are an example, the marker 12c may be provided on the shaft 13 instead of the sensor unit 12, and the marker 14a may be provided at a portion other than the distal portion of the catheter sheath 11a.

Figure 5:
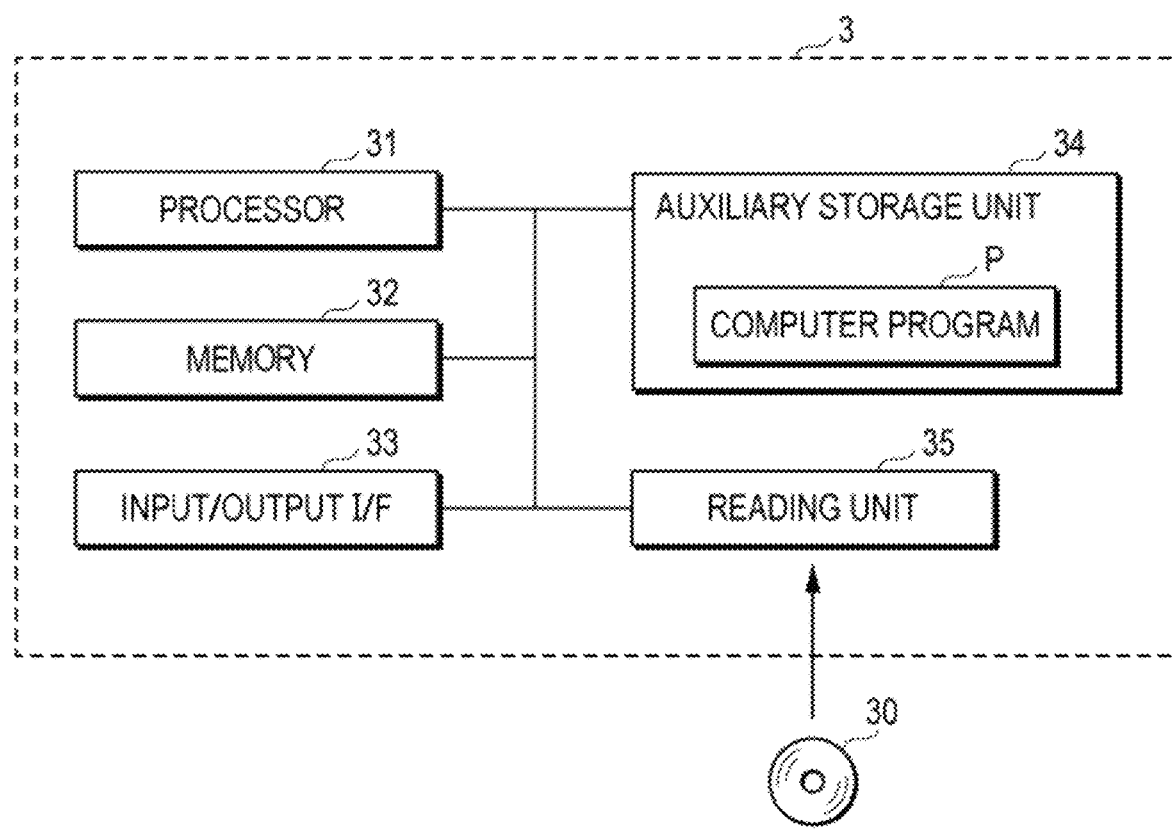
FIG. 5 is a block diagram illustrating a configuration example of an image processing apparatus.

FIG. 5 is a block diagram illustrating a configuration example of the image processing apparatus 3. The image processing apparatus 3 includes a processor 31, a memory 32, an input/output interface (I/F) 33, an auxiliary storage unit 34, and a reading unit 35.

The processor 31 includes, for example, one or more central processing units (CPU), one or more micro-processing units (MPU), one or more graphics processing units (GPU), one or more general purpose graphics processing units (GPGPU), and one or more tensor processing units (TPU). The processor 31 is connected to each hardware component of the image processing apparatus 3 via a bus.

The memory 32 includes, for example, a static random access memory (SRAM), a dynamic random access memory (DRAM), or a flash memory, and temporarily stores data necessary for the processor 31 to execute arithmetic processing.

The input/output I/F 33 is an interface to which the intravascular inspection apparatus 101, the angiography apparatus 102, the display apparatus 4, and the input apparatus 5 are connected. The processor 31 acquires the IVUS image and the OCT image from the intravascular inspection apparatus 101 via the input/output I/F 33, and acquires the angiographic image from the angiography apparatus 102. In addition, the processor 31 outputs medical image signals of the IVUS image, the OCT image, or the angiographic image to the display apparatus 4 via the input/output I/F 33, thereby displaying the medical image on the display apparatus 4. Furthermore, the processor 31 receives information input to the input apparatus 5 via the input/output I/F 33.

For example, a communication unit including a wireless communication device supporting 4G, 5G, or Wi-Fi may be connected to the input/output I/F 33, and the image processing apparatus 3 may be communicably connected to an external server such as a cloud server connected to an external network such as the Internet via the communication unit. The image processing apparatus 3 may communicate with the external server via the communication unit and the external network, refer to medical data, paper information, and the like stored in a storage device included in the external server, and perform processing for providing support information. Alternatively, the processor 31 may cooperatively perform the processing in the present embodiment by performing, for example, inter-process communication with the external server.

The auxiliary storage unit 34 is a storage device such as a hard disk, an electrically erasable programmable ROM (EEPROM), or a flash memory. The auxiliary storage unit 34 stores a computer program P executed by the processor 31 and various data necessary for processing by the processor 31. Note that the auxiliary storage unit 34 may be an external storage device connected to the image processing apparatus 3. The computer program P may be stored in the auxiliary storage unit 34 at the manufacturing stage of the image processing apparatus 3, or the computer program distributed by a remote server device may be acquired by the image processing apparatus 3 through communication and stored in the auxiliary storage unit 34. The computer program P may be recorded in a non-transitory computer readable recording medium 30 such as a magnetic disk, an optical disk, or a semiconductor memory, and the reading unit 35 may read the computer program P from the recording medium 30 and store the computer program P in the auxiliary storage unit 34.

The image processing apparatus 3 may be composed of multiple processing devices. In addition, the image processing apparatus 3 may be a server client system, a cloud server, or a virtual machine operating as software. In the following description, it is assumed that the image processing apparatus 3 is one processing device. In the present embodiment, the image processing apparatus 3 is connected to the angiography apparatus 102 that images two-dimensional angiographic images. However, the present invention is not limited to that configuration, and the image processing apparatus may be connected to any apparatus that images a luminal organ of a patient and the image diagnosis catheter 1 from a plurality of directions outside the living body.

In the image processing apparatus 3 of the present embodiment, the processor 31 reads and executes the computer program P stored in the auxiliary storage unit 34, thereby executing processing of generating the IVUS image based on the signal data set received from the IVUS sensor 12a and the OCT image based on the signal data set received from the OCT sensor 12b. Note that, since observation positions of the IVUS sensor 12a and the OCT sensor 12b are shifted at the same imaging timing as described later, the processor 31 executes processing of correcting the shift of the observation positions in the IVUS image and the OCT image. Therefore, the image processing apparatus 3 of the present embodiment provides an image that is easy to read by providing the IVUS image and the OCT image in which the observation positions are matched.

In the present embodiment, the image diagnosis catheter is a dual type catheter having functions of both intravascular ultrasound and optical coherence tomography, but is not limited thereto. The image diagnosis catheter may be a single type catheter having the function of either the intravascular ultrasound or the optical coherence tomography. Hereinafter, in the present embodiment, the image diagnosis catheter has the function of the intravascular ultrasound, and will be described based on the IVUS image generated by the IVUS function. However, in the description of the present embodiment, the medical image is not limited to the IVUS image, and the processing of the present embodiment may be performed using the OCT image as the medical image.

Figure 6:
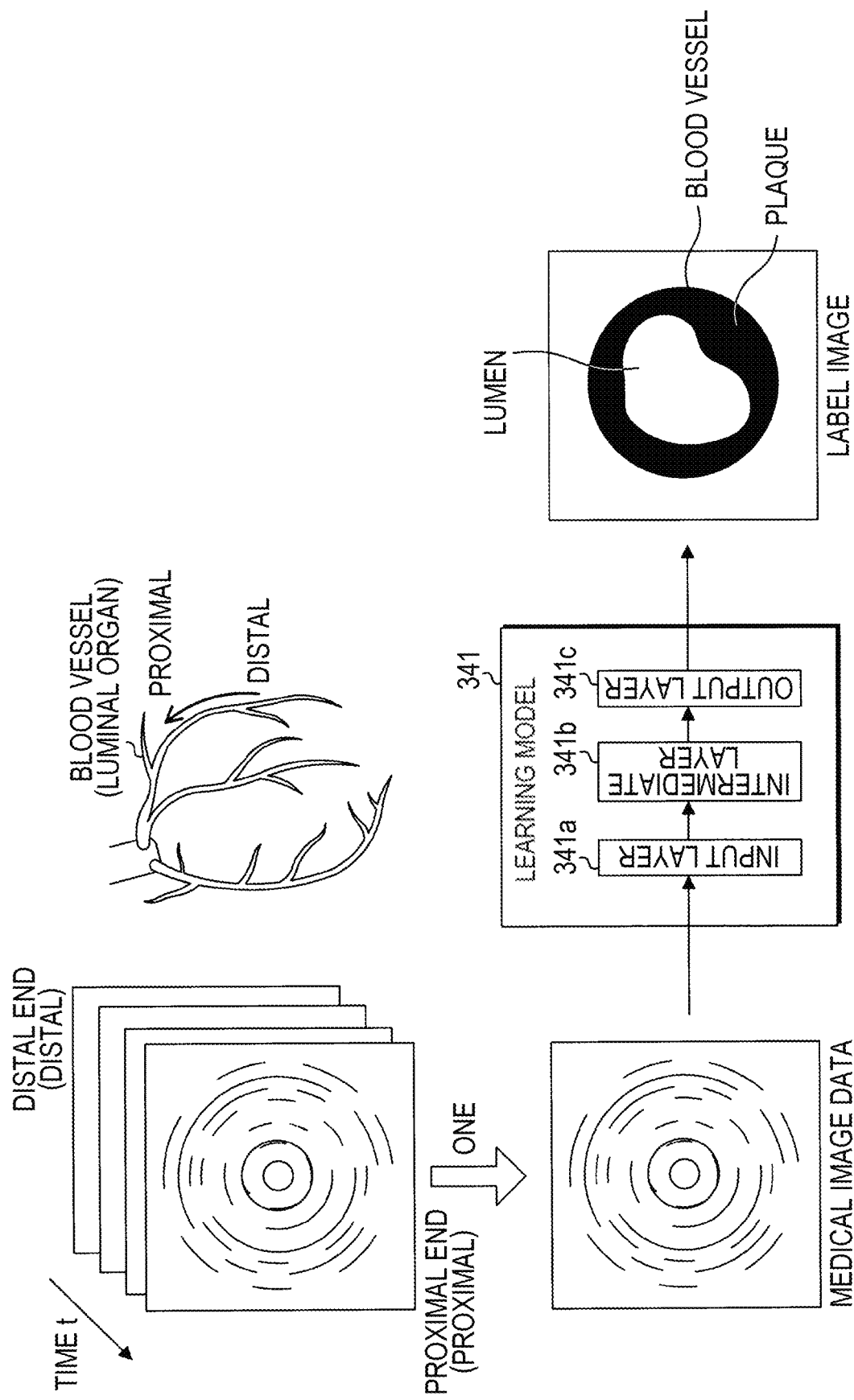
FIG. 6 is a diagram illustrating an example of a learning model.

FIG. 6 is a diagram illustrating an example of a learning model 341. The learning model 341 is, for example, a neural network that performs object detection, semantic segmentation, or instance segmentation. Based on each IVUS image in the input IVUS image group, the learning model 341 outputs whether an object such as a stent or a plaque is included (i.e., present or absent) in the IVUS image, and in a case where the object is included (i.e., present), the learning model outputs a type or class of the object, a region in the IVUS image, and estimation accuracy or a score.

The learning model 341 includes, for example, a trained convolutional neural network (CNN) by deep learning. The learning model 341 includes, for example, an input layer 341a to which a medical image such as an IVUS image is input, an intermediate layer 341b that extracts a feature amount of the image, and an output layer 341c that outputs information indicating a position and a type of an object included in the medical image. The input layer 341a of the learning model 341 has a plurality of neurons that receives an input of a pixel value of each pixel included in the medical image, and passes the input pixel value to the intermediate layer 341b. The intermediate layer 341b has a configuration in which a convolution layer for convoluting the pixel value of each pixel input to the input layer 341a and a pooling layer for mapping the pixel value convoluted by the convolution layer are alternately connected, and extracts the feature amount of an image while compressing pixel information of the medical image. The intermediate layer 341b passes the extracted feature amount to the output layer 341c. The output layer 341c includes one or a plurality of neurons that output the position, range, type, and the like of the image region of the object included in the image, for example, as a label image. The label image is, for example, an image in which a pixel corresponding to a plaque region is of a class "1" and pixels corresponding to other images are of a class "0". Although the learning model 341 is the CNN, the configuration of the learning model 341 is not limited to the CNN. The learning model 341 may be, for example, a trained model having a configuration such as a neural network other than CNN, a fully convolution network (FCN) such as U-net, SegNet, SSD, SPPnet, a support vector machine (SVM), a Bayesian network, or a regression tree. Alternatively, the learning model 341 may input the image feature amount output from the intermediate layer to the support vector machine (SVM) to perform object recognition. As described above, the learning model 341 has a segmentation function, an object detection function, a classification function, or a regression function, and outputs information regarding an object included in the medical image by performing segmentation, object detection, classification, or regression. The information regarding the object includes the presence or absence, the type, the region, or the estimation accuracy or score of the object.

The learning model 341 can be generated by preparing training data in which the medical image including an object such as a stent, a plaque, a calcified portion, or dissociation and a label or label image indicating the position or region and the type of each object are associated with each other and causing an untrained neural network to perform machine learning using the training data. According to the learning model 341 configured in this manner, by inputting the medical image such as the IVUS image to the learning model 341, information indicating the position and type of the object included in the medical image can be obtained. In a case where no object is included in the medical image, the information indicating the position and the type is not output from the learning model 341. Therefore, by using the learning model 341, the processor 31 can acquire whether the object is included in the medical image input to the learning model 341, and in a case where the object is included, the control unit can acquire the type, the position, and the estimation accuracy of the object. That is, by using the learning model 341 trained in this manner, it is possible to acquire the label image indicating the region of the plaque in units of pixels by inputting the IVUS image to the learning model 341 as illustrated in the present embodiment. A plaque region extracted in the IVUS image includes a combination of the plaque itself made of a cholesterol or the like and media. That is, in the present embodiment, the plaque on the IVUS image indicates a region where the plaque and the media are combined.

The processor 31 may input each IVUS image or the like to the learning model 341 one by one and perform processing, but may simultaneously input a plurality of consecutive frame images and simultaneously detect the region of the plaque from the plurality of frame images. For example, the processor 31 sets the learning model 341 as a 3D-CNN (for example, a 3D U-net) that handles three-dimensional input data. Then, the processor 31 processes the data as three-dimensional data in which the coordinates of the two-dimensional frame image are set to two axes and a time "t" at which each frame image is acquired is set to one axis. The processor 31 inputs a plurality of frame images (for example, 16 frames) for a predetermined unit time as one set to the learning model 341, and simultaneously outputs an image in which the region of the plaque is labeled with respect to each of the plurality of frame images. As a result, the region of the plaque can be detected in consideration of the frame images before and after being continuous in time series, and detection accuracy can be improved.

The processor 31 generates object information regarding the type and region of the object included in the IVUS image based on the information acquired from the learning model 341. Alternatively, the processor 31 may use the information output from the learning model 341 as the object information.

Figure 7:
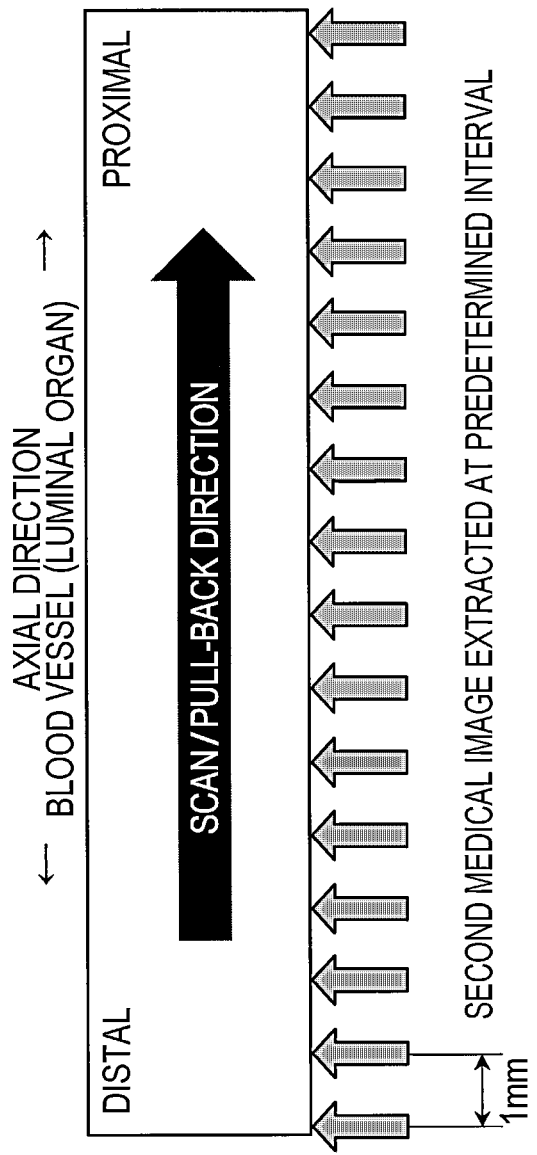
FIG. 7 is an explanatory diagram related to extraction of a second medical image.
Figure 8:
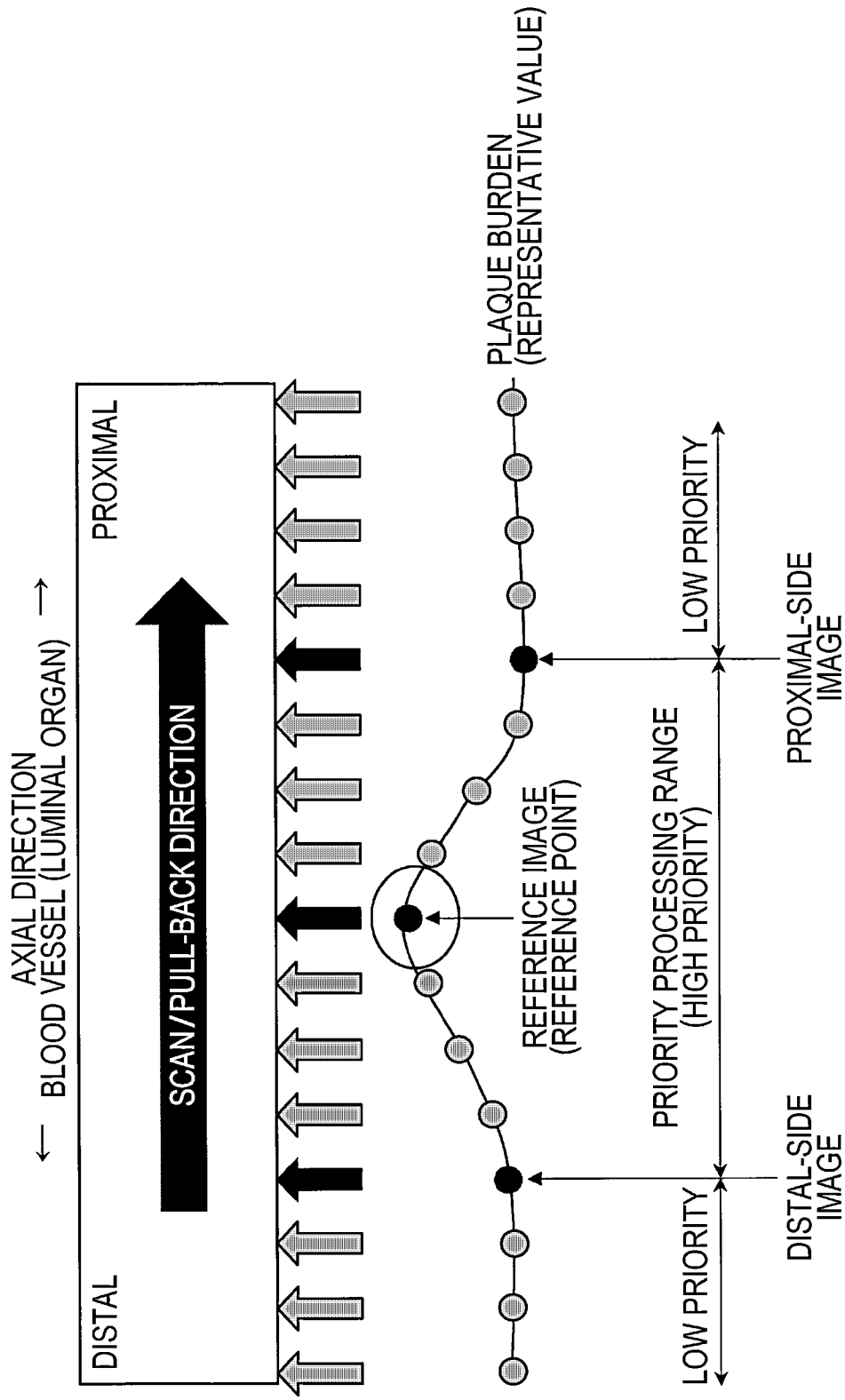
FIG. 8 is an explanatory diagram related to a representative value of the second medical image.
Figure 9:
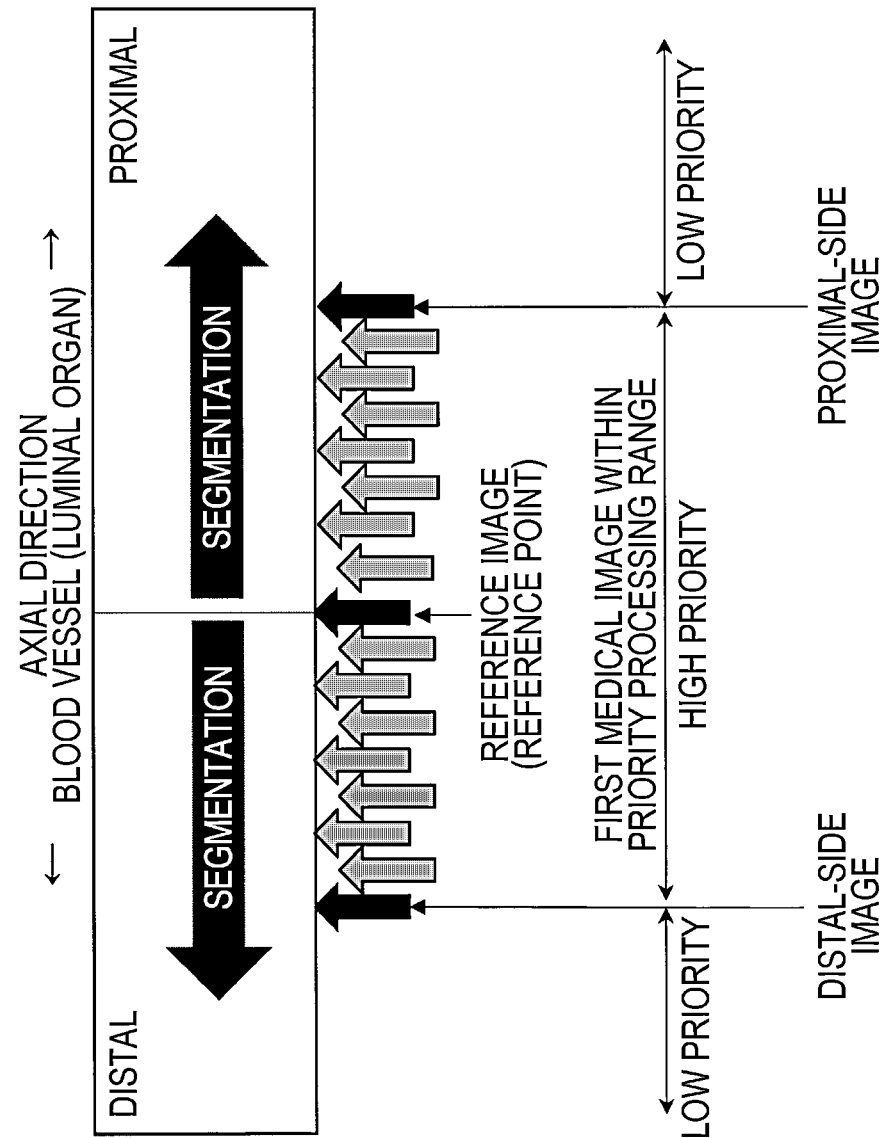
FIG. 9 is an explanatory diagram regarding a range determined based on a reference image.

FIG. 7 is an explanatory diagram related to extraction of a second medical image. FIG. 8 is an explanatory diagram related to a representative value or plaque burden of the second medical image. FIG. 9 is an explanatory diagram related to a range determined based on the reference image. With these illustrations in the present embodiment, the position in the axial direction and the like of the blood vessels corresponding to the generated IVUS images will be described.

In the pull-back operation, the sensor unit 12 is pulled back from a distal side toward a proximal side at a constant speed (for example, 0.5 mm/sec or 1.0 mm/sec) by the MDU 2. A spatial resolution of the imaging core in the generation of the IVUS image is, for example, 100 to 200 µm. For example, when the pull-back speed is 1.0 mm/sec and the spatial resolution is 100 µm, 10 IVUS images are generated per second. In this case, a length of the blood vessel included in the 10 IVUS images is 1 mm. That is, the 10 IVUS images illustrate a longitudinal tomographic view of the blood vessel for each distance of 0.1 mm. In addition, the 10 IVUS images are generated in units of 0.1 seconds. A time point at which the IVUS image is generated in this manner corresponds to the position in the axial direction of the blood vessel indicated by the IVUS image.

When arranged at the position of the blood vessel indicated by each generated IVUS image along the axial direction of the blood vessel, the plurality of IVUS images are positioned according to the separation distance determined based on the pull-back speed and the spatial resolution. As a result, the position of each of the plurality of IVUS images in the axial direction of the blood vessel is specified. That is, the position of the generated IVUS image indicates the position in the axial direction of the blood vessel included in the IVUS image.

In a case where the pull-back length is 10 cm (100 mm), 1000 IVUS images are generated with a pull-back time of 10 seconds. In this way, all the IVUS images acquired by one pull-back scan are set as the first IVUS images (hereinafter also referred to as the first medical images). For example, in the first IVUS images arranged along the axial direction of the blood vessel through the separation distance in units of 0.1 mm, for example, a plurality of IVUS images is extracted at predetermined intervals of 1 mm as the second IVUS images. That is, the first IVUS images includes the IVUS images extracted as the second IVUS images and the remaining IVUS images not extracted as the second IVUS images.

From the viewpoint of the generated time point, the second IVUS images extracted at a predetermined interval of every 1 mm are extracted at a time point interval of one second. That is, the IVUS images extracted at a time point interval of one second (sampling cycle of one second) from the first IVUS images (i.e., all generated IVUS images) correspond to the second IVUS images. In this manner, by extracting the second IVUS images from all the IVUS images at a predetermined distance interval such as 1 mm, it is possible to efficiently extract the second IVUS images over the entire length of the blood vessel on which the pull-back operation is performed. Since the distance interval for extraction is about 1 mm, even when a stent type having a stent length of 3 mm is prepared, an appropriate stent type can be selected.

As described above, the plurality of second IVUS images correspond to some of all the IVUS images (i.e., the first IVUS images) generated in one pull-back operation. For example, by extracting IVUS images at a predetermined interval (spatial resolution: 100 µm) every 1 mm, the number of the second IVUS images becomes ⅒ of the number of the first IVUS images.

FIG. 7 illustrates the second IVUS images extracted at intervals of 1 mm, for example, in a blood vessel to be pulled back. Nine first IVUS images (i.e., first IVUS images not extracted as second IVUS images in all generated IVUS images) are located between two adjacent second IVUS images. Each of the plurality of extracted second IVUS images is input to the learning model 341 to be subjected to segmentation processing, and a region of an object such as a plaque in each of the plurality of second IVUS images is specified.

In each of the second IVUS images, the processor 31 calculates a plaque burden (i.e., a plaque cross-sectional area ratio) that is a ratio of an area of a plaque region to a cross-sectional area of a blood vessel. A blood vessel in the IVUS image indicates a region surrounded by the external elastic plate, lamina (EEL), or membrane (EEM). The processor 31 may use the plaque burden as a representative value of each of the second IVUS images, generate a graph as illustrated in the present embodiment, and control the display apparatus 4 to display the generated graph.

The processor 31 specifies the largest plaque burden in each of the second IVUS images, and specifies the second IVUS image having the largest plaque burden as a reference image. Since the reference image is the IVUS image having the largest plaque burden, the reference image is the IVUS image that is highly likely to be used for decision making when a physician or the like performs lesion analysis. By performing such processing, first, the specified reference image and the position (hereinafter also referred to as the reference point) of the reference image can be provided to a physician or the like at an early stage.

The processor 31 specifies a distal-side image and a proximal-side image from the second IVUS images located on the distal side and the proximal side with the position of the reference image as the reference point. For example, the processor 31 may specify the second IVUS image having the minimum plaque burden as the distal-side image and the proximal-side image within a predetermined range around the position of the reference image.

The reference image is located between the specified distal-side image and proximal-side image, and the processor 31 may set a range from the distal-side image to the proximal-side image as a priority processing range or high priority range and set a range other than the range from the distal-side image to the proximal-side image as a low priority range. In the present embodiment, the low priority range includes two ranges including a range on the proximal side of the proximal-side image and a range on the proximal side of the distal-side image.

The processor 31 specifies a plurality of first IVUS images located in the range from the distal-side image to the proximal-side image that is the priority processing range, and inputs the specified first IVUS images to the learning model 341. The IVUS images located in the range from the distal-side image to the proximal-side image include the second IVUS images already input to the learning model 341 and the first IVUS images not extracted as the second IVUS images. Therefore, the processor 31 may input only the first IVUS images not extracted as the second IVUS images among the first IVUS images located in the range from the distal-side image to the proximal-side image to the learning model 341.

When inputting the first IVUS images located in the range from the distal-side image to the proximal-side image to the learning model 341, the processor 31 may input the first IVUS images to the learning model 341 in order of proximity to the reference image. In this case, the first IVUS image on either the distal side or the proximal side adjacent to the reference image is input to the learning model 341 first, and the first IVUS image on either adjacent to the distal-side image or the proximal-side image is finally input to the learning model 341. In the plurality of first IVUS images located in the range from the distal-side image to the proximal-side image, it is assumed that the first IVUS image close to the reference image includes more information regarding a lesion. Therefore, by sequentially inputting the first IVUS images to the learning model 341 in the order of proximity to the reference image in this manner, the support information can be efficiently provided to the physician or the like.

The processor 31 may output information regarding an object such as a plaque included in the first IVUS image located in the range from the distal-side image to the proximal-side image by acquiring the estimation result by the learning model 341, and cause the display apparatus 4 to display the information. The information regarding the object may include, for example, an image indicating the region of the plaque included in each of the first IVUS images, the plaque burden, a blood vessel diameter or area, a lumen diameter or area, and a stenosis rate.

The processor 31 may perform processing such as inputting the first IVUS image located in the high priority range from the distal-side image to the proximal-side image to the learning model 341, and then perform processing such as inputting the first IVUS image located in a low priority range to the learning model 341. In the present embodiment, the plaque burden is used as the representative value in the second IVUS image, but the present invention is not limited thereto. For example, the processor 31 may specify the reference screen or the like by using, as a representative value, a measurement value measured based on the ratio of the diameter or the area of the blood vessel to the diameter or the area of the blood vessel included in the second IVUS image, and the type of object such as the stenosis rate, the stent, the dissociation, or the calcified portion. When these measurement values and the like are used as representative values, the reference screen may be specified based on the minimum value.

Figure 10:
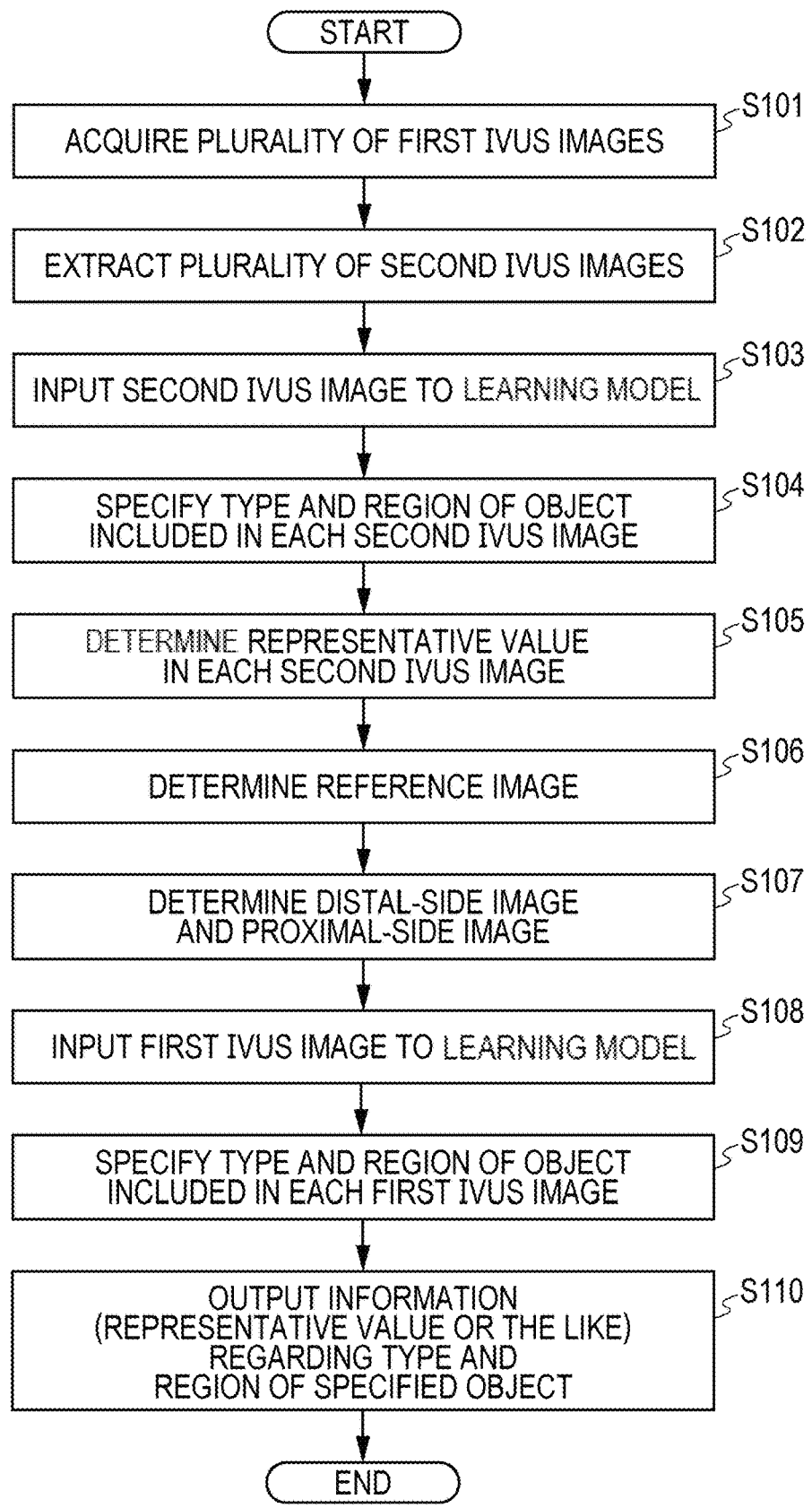
FIG. 10 is a flowchart of information processing performed by the image processing apparatus.

FIG. 10 is a flowchart of information processing performed by the processor 31. The processor 31 of the image processing apparatus 3 executes the following processing based on input data or the like output from the input apparatus 5 in response to an operation of an operator of the image diagnosis catheter, such as a physician.

The processor 31 acquires a plurality of first IVUS images generated along the axial direction of a luminal organ such as a blood vessel (S101). The processor 31 acquires, as the first IVUS images, all the IVUS images obtained during one pulling back operation.

The processor 31 extracts a plurality of second IVUS images at predetermined intervals in the axial direction of the luminal organ from the plurality of first IVUS images (S102). The processor 31 extracts a plurality of IVUS images at a predetermined interval of every 1 mm in the axial direction of the blood vessel, for example, from the plurality of first IVUS images, as the second IVUS images. In a case where the spatial resolution of the imaging core in the generation of the IVUS image is, for example, 100 μm (0.1 mm), $\frac{1}{10}$ of the number of the first IVUS images is extracted as the second IVUS images. In the present embodiment, the predetermined interval is 1 mm (i.e., the time point interval is one second), but the present invention is not limited thereto, and the image processing apparatus 3 may include, for example, a selection unit that receives selection by a physician or the like within a predetermined range, such as 0.5 mm to 1.5 mm (such as 0.5 seconds to 1.5 seconds), and may enable selection of the predetermined interval. The value of the predetermined interval for extracting the second IVUS images may be stored in the auxiliary storage unit 34 of the image processing apparatus 3.

The processor 31 inputs the plurality of extracted second IVUS images to the learning model 341 (S103). For example, the processor 31 inputs the plurality of second IVUS images extracted at a predetermined interval of every 1 mm to the learning model 341 having the function of the segmentation network.

The processor 31 specifies the type and region of an object included in each of the second IVUS images based on the estimation result output from the learning model 341 (S104). The learning model 341 outputs information regarding the type, the region, and the estimation accuracy of the object such as a plaque included in the input IVUS image as an estimation result. Alternatively, the learning model 341 may specify an external elastic plate (Vessel)membrane and a lumen of the blood vessel included in the IVUS image as the type of object, and specify the plaque interposed therebetween based on the external elastic plate and the lumen of the blood vessel. For example, in a case where the type of the object is a plaque, the processor 31 specifies the region of the plaque included in each of the second IVUS images based on the estimation result output from the learning model 341.

The processor 31 determines a representative value in each of the plurality of second IVUS images based on the specified type and region of the object (S105). The processor 31 determines the plaque burden (i.e., plaque cross-sectional area ratio) calculated based on the specified plaque or the like as the representative value in each of the plurality of second IVUS images. In the present embodiment, the plaque burden is used as the representative value in the second IVUS image, but the present invention is not limited thereto, and for example, the measurement value measured based on the type of object such as the ratio of the diameter or the area of the blood vessel to the one of the lumen, the stenosis rate, the stent, the dissociation, or the calcified portion may be used as the representative value.

The processor 31 determines a reference image from the plurality of second IVUS images based on the determined representative value (S106). The processor 31 determines, for example, the second IVUS image having the largest representative value or plaque burden as the reference image based on the representative value determined for each of the plurality of second IVUS images.

The processor 31 determines the distal-side image and the proximal-side image based on the determined representative value and the reference image (S107). With the position in the axial direction of the blood vessel indicated by the reference image as the reference point, the processor 31 determines the second IVUS image having the smallest representative value among the second IVUS images on the distal side and the proximal side as the distal-side image and the proximal-side image. When determining the distal-side image and the proximal-side image, the processor 31 may determine the distal-side image and the proximal-side image within a predetermined range around the reference point based on the reference image.

The processor 31 inputs the first IVUS images located between the distal-side image and the proximal-side image to the learning model 341 (S108). The plurality of first IVUS images that are not extracted as the second IVUS images are located between the distal-side image and the proximal-side image. Since the reference image is included in the range from the distal-side image to the proximal-side image, the range corresponds to the high priority range in which processing is preferentially performed. The processor 31 may input only the first IVUS images not extracted as the second IVUS images among the first IVUS images located in the range from the distal-side image to the proximal-side image to the learning model 341.

Based on the estimation result output from the learning model 341, the processor 31 specifies the type and region of the object included in each of the first IVUS images located between the distal-side image and the proximal-side image (S109). Based on the estimation result output from the learning model 341, the processor 31 specifies the region of the plaque included in each of the first IVUS images located in the high priority range from the distal-side image to the proximal-side image.

The processor 31 controls the display apparatus 4 to output information (e.g., the representative value or the like) regarding the type and region of the specified object (S110). The processor 31 controls the display apparatus 4 to output information regarding the type and region of the object such as the plaque specified in each of the first IVUS images located in the high priority range including the reference image. In outputting the information, the processor 31 may include, in the information, the measurement value measured based on the type of the object such as the plaque burden, the ratio of the diameter or the area of the blood vessel to the one of the lumen, the stenosis rate, the stent, the dissociation, or the calcified portion in each of the first IVUS images located in the high priority range. After performing processing such as inputting the first IVUS images located in the high priority range from the distal-side image to the proximal-side image into the learning model 341, the processor 31 may also perform processing similar to the high priority range such as inputting the first IVUS images located in the low priority range other than the range from the distal-side image to the proximal-side image into the learning model 341.

In the flowchart in the present embodiment, the description has been given assuming that the processor 31 sequentially performs the processing from S101 to S104, but the present invention is not limited thereto. In parallel with the processing of generating and acquiring the first IVUS images by performing the pull-back, that is, during the pull-back operation, the processor 31 may perform extraction of the second IVUS images from the plurality of already generated first IVUS images at predetermined intervals and inputting the second IVUS images to the learning model 341 to specify the type and region of the object. That is, the processor 31 may extract the second IVUS images at predetermined intervals while performing the pull-back and input the second IVUS images to the learning model 341 to advance segmentation. The processor 31 may perform the processing from S101 to S105 in parallel the pull back operation.

Figure 11:
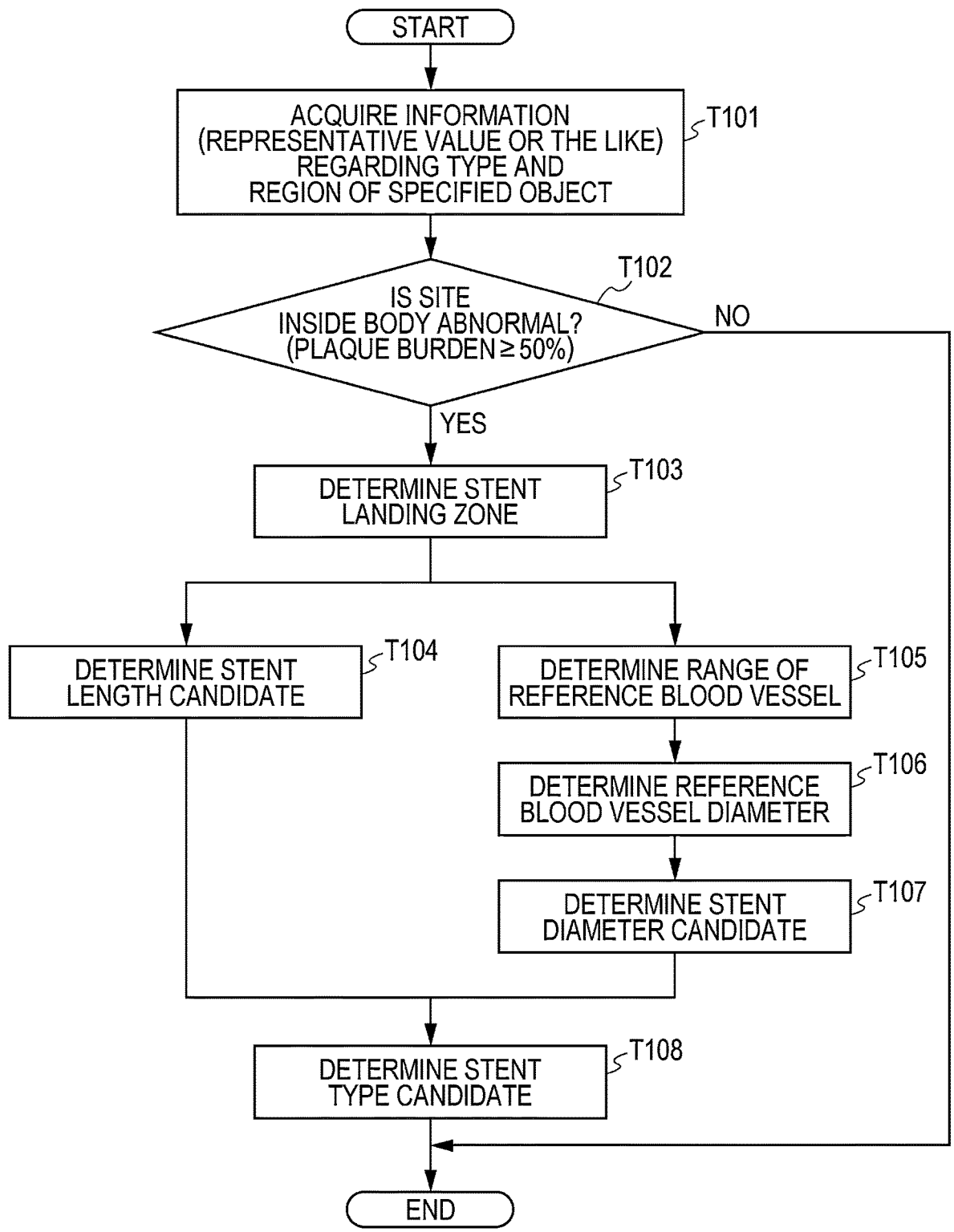
FIG. 11 is a flowchart of a stent size selection procedure.

FIG. 11 is a flowchart illustrating a stent size selection procedure. The processor 31 of the image processing apparatus 3 executes the following processing based on input data or the like output from the input apparatus 5 in response to an operation by an operator of the image diagnosis catheter, such as a physician. The processor 31 performs the following processing regarding selection of the stent size based on the information (i.e., the representative value and the like) regarding the type and region of the object included in the first IVUS image acquired in the above-described processing S101 to S110.

The processor 31 acquires the information (i.e., the representative value or the like) regarding the type and the region of the specified object (T101). The processor 31 acquires the information regarding the type and region of the object specified in the first IVUS image located in the high priority range from the distal-side image to the proximal-side image by using the output result of the processing S110 in the above-described flow. The processor 31 may start a stent selection application (APP) for selecting the stent size using the acquired information as an input factor.

The processor 31 determines whether a site inside the body is abnormal based on the representative value of the reference image and the like (T102). In a case where the representative value indicates a plaque burden, the processor 31 determines whether the site inside the body illustrated in the IVUS image (i.e., the reference image) is abnormal based on whether the plaque burden is a predetermined value or more, for example, 50% or more. Alternatively, the processor 31 may determine whether the site inside the body is abnormal in accordance with the property of the blood vessel, the presence or absence of findings of risk of complication, plaque distribution, calcification, side branch, or remodeling in the site inside body indicated in the reference image.

When the site inside the body is abnormal (T102: YES), the processor 31 determines a stent landing zone based on the position of the reference image and the like (T103). The processor 31 determines a stent length candidate (T104). The processor 31 determines the stent landing zone based on information such as the representative value of each of the first IVUS images including the reference image. The processor 31 determines the stent length candidate based on the determined stent landing zone.

The processor 31 determines a range of a reference blood vessel (T105). For example, the processor 31 determines the range within 1 cm front of and back of (i.e., on the distal and proximal sides of the reference point) the lesion included in the reference image or the like as the range of the reference blood vessel.

The processor 31 determines a reference blood vessel diameter (T106). The processor 31 determines the maximum value of the blood vessel diameter as the reference blood vessel diameter in the determined range of the reference blood vessel.

The processor 31 determines a stent diameter candidate (T107). The processor 31 determines, for example, 0.9 times the determined reference blood vessel diameter as the stent diameter candidate. Alternatively, the processor 31 may determine the stent diameter candidate based on a representative value calculated from a distal reference lumen diameter, a lumen diameter such as a Mid-wall, or a blood vessel diameter.

When the site inside the body is not abnormal (T102: NO) or after execution of T104 and T107, the processor 31 determines a stent type candidate (T108). The processor 31 determines a stent type candidate having an appropriate size by selecting a stent type prepared in advance according to the determined stent diameter candidate and stent length candidate.

According to the present embodiment, the image processing apparatus 3 extracts a plurality of second medical images (i.e., second IVUS images) from all the acquired first medical images (i.e., first IVUS images), and inputs each of the extracted second medical images to the learning model 341. The image processing apparatus 3 may extract the plurality of second medical images at predetermined intervals such as 1 mm in the axial direction of the luminal organ, for example. By extracting in this manner, the number of the second medical images can be made smaller than the number of the first medical images. Therefore, the reference image can be determined by inputting the second medical images, the number of which is smaller than the number of the first medical images, to the learning model 341, and the calculation load for using the learning model 341 can be reduced, and a time required for determining the reference image can be reduced.

Since the reference image is determined based on the type and region of the object specified by the estimation result of the learning model 341, the reference image includes the site inside the body used for decision making when an operator of the image diagnosis catheter such as a physician performs pathology analysis. Since the image processing apparatus 3 inputs the first medical image in the predetermined range in the axial direction of the luminal organ from the reference image to the learning model 341, the image processing apparatus 3 can preferentially input the first medical image in the predetermined range including the reference image, such as the vicinity of the reference image, to the learning model 341, and can efficiently detect the information regarding the object included in these first medical images. By performing such processing, for example, as compared with a case where all the medical images generated using the image diagnosis catheter are uniformly input to the learning model 341, the calculation load can be reduced, and some of the medical images within a predetermined range including the reference image can be preferentially input to the learning model 341, and the support information for the physician or the like can be provided at an early stage.

In the present embodiment, the input to the learning model 341 is not limited to only some medical images within the predetermined range including the reference image. After some of the medical images are input to the learning model 341, the remaining medical images may be input to the learning model 341 to specify the types and regions of the objects in the remaining medical images. That is, the priority order of processing for the remaining medical images may be lower than the priority order of processing for some medical images within a predetermined range including the reference image.

According to the present embodiment, the image processing apparatus 3 specifies the external elastic plate and the lumen of the blood vessel as the type of the object, and calculates the area ratio (i.e., the plaque burden) of the plaque based on the regions of the external elastic plate and the lumen of the specified blood vessel. Since the image processing apparatus 3 determines the plaque burden as a representative value of each of the second medical images and determines the reference image based on the representative value, it is possible to efficiently determine the reference image including the site inside the body required for the physician or the like to make a decision when performing lesion analysis or the like. In the present embodiment, the plaque burden is used as the representative value, but the present invention is not limited thereto, and for example, a stenosis rate or the like using a predetermined reference value may be used as the representative value.

According to the present embodiment, since the second medical image having the largest plaque burden as the representative value is determined as the reference image, it is possible to efficiently determine the reference image including the site inside the body required for the physician or the like to make a decision when performing lesion analysis or the like. Since the second medical image having the smallest representative value among the second medical images located distally and proximally with respect to the reference image is determined as the distal-side image and the proximal-side image, a range including the reference image can be efficiently specified.

According to the present embodiment, the necessity of the stent is determined based on the representative value indicating the plaque burden. For example, when the plaque burden is 50% or more, the image processing apparatus 3 specifies a stent length candidate based on the distance from the distal-side image to the proximal-side image, that is, the distance from the site where the distal-side image is generated to the site where the proximal-side image is generated. Furthermore, the image processing apparatus 3 specifies a stent diameter candidate based on any smaller lumen diameter in the lumen diameters of the lumens in the distal-side image and the proximal-side image, for example. The stent diameter candidate may be specified as, for example, 90% (0.9 times) of the smaller lumen diameter. As described above, the image processing apparatus 3 can efficiently specify the stent size candidate based on the representative value and the distal-side image and the proximal-side image, and can output information regarding the specified stent size candidate and support lesion analysis or the like by a physician or the like.

Second Embodiment

Figure 12:
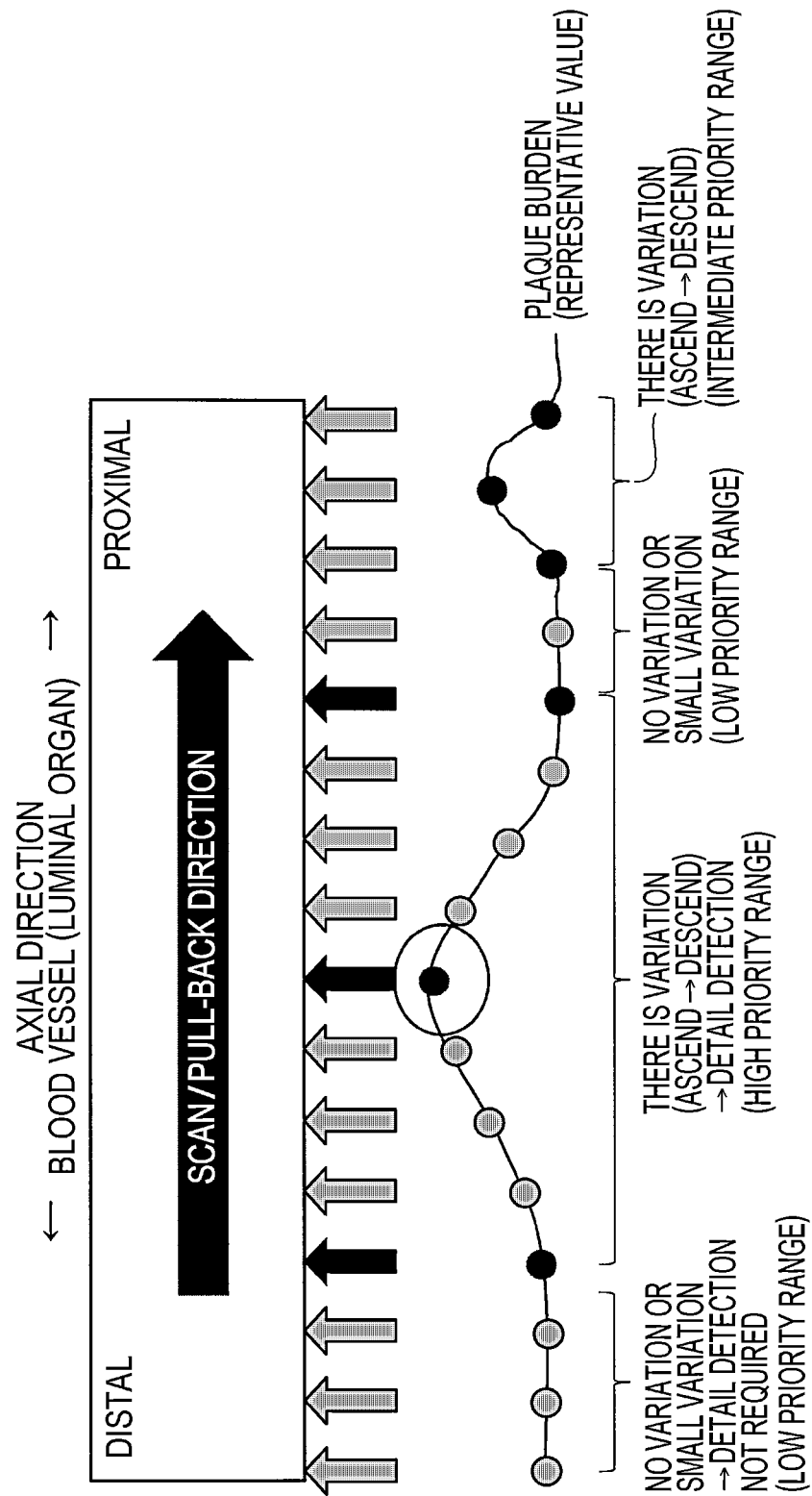
FIG. 12 is an explanatory diagram regarding a range determined based on a reference image in a second embodiment.

FIG. 12 is an explanatory diagram related to a range determined based on a reference image in a second embodiment. The processor 31 in the second embodiment specifies the reference image based on a change rate of the plaque burden of each of the second IVUS images.

The processor 31 may determine an approximate curve expression of the plaque burden specified according to the position of each second IVUS image, and specify the reference image based on the position where a differential value in the approximate curve expression is 0 (i.e., change point at which minute change from positive to negative). That is, the processor 31 may obtain, from a differential value or the like, a position having a large variation in a neighboring value, and specify a detection range and a rough detection range in detail.

In a case where a plurality of reference images is specified by the calculated differential value, the processor 31 may determine the priority of these reference images (i.e., reference points) based on the size of plaque burden. In the present embodiment, for example, two positions at which the differential value becomes 0 (i.e., a change point at which a minute change changes from positive to negative) are included. In this case, the processor 31 may determine a reference image having a large plaque burden as a reference point for determining a high priority range, and may determine a reference image having a small plaque burden as a reference point for determining a medium priority range.

In a case where there are a plurality of reference images having different priorities, the processor 31 may perform processing related to individual reference images according to the priority. That is, the processor 31 may input the first IVUS image in the range based on the reference image having the highest priority to the learning model 341, and then input the first IVUS image in the range based on the reference image having the next highest priority to the learning model 341.

In a case where the stent lands, the processor 31 may perform stent detection and perform scanning processing using segmentation or the like by the learning model 341 in detail only at a portion having the stent. In the processing related to the finding of risk of complication, blood vessel dissociation or the like may be overlooked at a wide interval. Meanwhile, when finding the finding of dissociation or the like in the second IVUS image), the vicinity thereof may be scanned in detail at an interval of 0.1 mm or the like. In addition, in a case where a portion having a complication risk is known in advance from the angiographic image, the range determined automatically or manually by the operator may be scanned in detail using segmentation or the like by the learning model 341.

According to the present embodiment, by obtaining, from a differential value or the like, a part of the representative value of each of the second IVUS images having a large variation with a neighboring value, the second IVUS image is preferentially input to the learning model 341, and a range in which scanning using segmentation or the like is performed is determined. Therefore, the first IVUS image to be preferentially processed can be efficiently specified.

It should be understood that the embodiments disclosed herein are illustrative in all respects and are not restrictive. The technical features described in the examples can be combined with each other, and the scope of the present invention is intended to include all modifications within the scope of the claims and the scope equivalent to the claims.

What is claimed is:

1. A medical system comprising:
a catheter that includes a sensor and can be inserted into a luminal organ;
a display apparatus; and
an image processing apparatus configured to:
generate a plurality of first cross-sectional images of the luminal organ based on signals that are output from the sensor when the catheter is being moved in a direction along the luminal organ therein,
select a plurality of second cross-sectional images from the first cross-sectional images at predetermined intervals,
input the second cross-sectional images to a machine learning model and acquire an output indicating a type and region of an object included in each of the second cross-sectional images,
determine one of the second cross-sectional images as a reference image based on the type and region of the object,
determine two or more of the first cross-sectional images generated before and after the reference image,
input said two or more of the first cross-sectional images to the machine learning model and acquire an output indicating the type and region of the object included in each of said two or more of the first cross-sectional images, and
cause the display apparatus to output information indicating the object based on the type and region of the object acquired from each of the reference image and said two or more of the first cross-sectional images.

2. The medical system according to claim 1, wherein the image processing apparatus configured to:
calculate a value indicating a characteristic of the object for each of the second cross-sectional images based on the type and region of the object, and
determine one of the second cross-sectional images as the reference image based on the value calculated for each of the second cross-sectional images.

3. The medical system according to claim 2, wherein the luminal organ is a blood vessel,
the object is a plaque between an external elastic plate and a lumen of the blood vessel, and
the value indicating the characteristic of the object is a plaque burden.

4. The medical system according to claim 3, wherein the image processing apparatus is configured to determine, as the reference image, one of the second cross-sectional images for which a maximum plaque burden is calculated.

5. The medical system according to claim 2, wherein the image processing apparatus is configured to:
determine, as a distal-side image, one of the second cross-sectional images of the luminal organ on a distal side of the luminal organ in the reference image, and
determine, as a proximal-side image, one of the second cross-sectional images of the luminal organ on a proximal side of the luminal organ in the reference image, and
said two or more of the first cross-sectional images are between the distal-side and proximal-side images.

6. The medical system according to claim 5, wherein the value calculated for the distal-side image has a first minimum value among the values calculated for the second cross-sectional images of the luminal organ on the distal side of the luminal organ in the reference image, and
the value calculated for the proximal-side image has a second minimum value among the values calculated for the second cross-sectional images of the luminal organ on the proximal side of the luminal organ of the reference image.

7. The medical system according to claim 5, wherein the image processing apparatus is configured to:
determine a type of a stent to be inserted into the luminal organ based on the value calculated for each of the reference image and said two or more of the first cross-sectional images, and
cause the display device to display information regarding the determined type of the stent.

8. The medical system according to claim 7, wherein the image processing apparatus is configured to:
   determine a landing zone of the stent in the luminal organ using the value calculated for each of the reference image and said two or more of the first cross-sectional images, and
   determine a length of the stent based on the determined landing zone.
9. The medical system according to claim 7, wherein the image processing apparatus is configured to:
   determine a diameter of a portion of the luminal organ between the luminal organs in the distal-side and proximal side images, and
   determine a diameter of the stent based on the determined diameter of the portion of the luminal organ.
10. The medical system according to claim 1, wherein
    the sensor of the catheter includes an ultrasound transmitter and receiver, and
    the image processing apparatus is configured to generate an ultrasonic tomographic image of the luminal organ based on signals that are output from the sensor.
11. A method for processing a medical image of a luminal organ, comprising:
    generating a plurality of first cross-sectional images of the luminal organ based on signals that are output from a sensor of a catheter when the catheter is inserted into the luminal organ and is being moved in a direction along the luminal organ;
    selecting a plurality of second cross-sectional images from the first cross-sectional images at predetermined intervals;
    inputting the second cross-sectional images to a machine learning model and acquiring an output indicating a type and region of an object included in each of the second cross-sectional images;
    determining one of the second cross-sectional images as a reference image based on the type and region of the object;
    determining two or more of the first cross-sectional images generated before and after the reference image;
    inputting said two or more of the first cross-sectional images to the machine learning model and acquiring an output indicating the type and region of the object included in each of said two or more of the first cross-sectional images; and
    outputting information indicating the object based on the type and region of the object acquired from each of the reference image and said two or more of the first cross-sectional images.
12. The method according to claim 11, wherein determining one of the second cross-sectional images includes:
    calculating a value indicating a characteristic of the object for each of the second cross-sectional images based on the type and region of the object, and
    determining one of the second cross-sectional images as the reference image based on the value calculated for each of the second cross-sectional images.
13. The method according to claim 12, wherein
    the luminal organ is a blood vessel,
    the object is a plaque between an external elastic plate and a lumen of the blood vessel, and
    the value indicating the characteristic of the object is a plaque burden.
14. The method according to claim 13, wherein the reference image is one of the second cross-sectional images for which a maximum plaque burden is calculated.
15. The method according to claim 12, further comprising:
    determining, as a distal-side image, one of the second cross-sectional images of the luminal organ on a distal side of the luminal organ in the reference image; and
    determining, as a proximal-side image, one of the second cross-sectional images of the luminal organ on a proximal side of the luminal organ in the reference image, and
    said two or more of the first cross-sectional images are between the distal-side and proximal-side images.
16. The method according to claim 15, wherein
    the value calculated for the distal-side image has a first minimum value among the values calculated for the second cross-sectional images of the luminal organ on the distal side of the luminal organ in the reference image, and
    the value calculated for the proximal-side image has a second minimum value among the values calculated for the second cross-sectional images of the luminal organ on the proximal side of the luminal organ in the reference image.
17. The method according to claim 15, further comprising:
    determining a type of a stent to be inserted into the luminal organ based on the value calculated for each of the reference image and said two or more of the first cross-sectional images; and
    displaying information regarding the determined type of the stent.
18. The method according to claim 17, wherein determining a type of a stent includes:
    determining a landing zone of the stent in the luminal organ using the value calculated for each of the reference image and said two or more of the first cross-sectional images, and
    determining a length of the stent based on the determined landing zone.
19. The method according to claim 17, wherein determining a type of a stent includes:
    determining a diameter of a portion of the luminal organ between the luminal organs in the distal-side and proximal side images, and
    determining a diameter of the stent based on the determined diameter of the portion of the luminal organ.
20. A medical image processing apparatus comprising:
    an interface circuit connectable to a display apparatus and a catheter that includes a sensor and can be inserted into a luminal organ; and
    a processor configured to:
      generate a plurality of first cross-sectional images of the luminal organ based on signals that are output from the sensor when the catheter is being moved in a direction along the luminal organ therein,
      select a plurality of second cross-sectional images from the first cross-sectional images at predetermined intervals,
      input the second cross-sectional images to a machine learning model and acquire an output indicating a type and region of an object included in each of the second cross-sectional images,
      determine one of the second cross-sectional images as a reference image based on the type and region of the object,
      determine two or more of the first cross-sectional images generated before and after the reference image, input said two or more of the first cross-sectional images to the machine learning model and acquire an output indicating the type and region of the object included in each of said two or more of the first cross-sectional images, and cause the display apparatus to output information indicating the object based on the type and region of the object acquired from each of the reference image and said two or more of the first cross-sectional images.

* * * * *